(12) United States Patent  
Aono et al.

(10) Patent No.: US 8,353,254 B2  
(45) Date of Patent: Jan. 15, 2013

(54) MOUNTING STRUCTURE OF AN INDICATING NEEDLE FOR AN INSTRUMENT SYSTEM

(75) Inventors: Yuusuke Aono, Shizuoka (JP); Shigeki Totsuka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 339 days.

(21) Appl. No.: 12/801,009

(22) Filed: May 17, 2010

(65) Prior Publication Data

US 2010/0294194 A1   Nov. 25, 2010

(30) Foreign Application Priority Data

May 20, 2009   (JP) ................................. 2009-121700

(51) Int. Cl.
*G01D 13/22* (2006.01)
*G01D 11/30* (2006.01)

(52) U.S. Cl. ..................... 116/328; 116/332; 116/DIG. 6

(58) Field of Classification Search .................. 116/62.1, 116/284, 286, 303, 305, 327, 328, 332, DIG. 6, 116/DIG. 36

See application file for complete search history.

(56) References Cited

U.S. PATENT DOCUMENTS

| | | | | |
|---|---|---|---|---|
| 1,840,039 A | * | 1/1932 | Joyce | 403/193 |
| 4,109,607 A | * | 8/1978 | Summers | 116/301 |
| 4,127,928 A | * | 12/1978 | Green | 29/453 |
| 4,625,262 A | | 11/1986 | Sakakibara et al. | |
| 4,723,504 A | * | 2/1988 | Griffin et al. | 116/332 |
| 4,860,170 A | | 8/1989 | Sakakibara et al. | |
| 5,080,035 A | * | 1/1992 | MacManus | 116/328 |
| 5,174,238 A | * | 12/1992 | Ohike | 116/328 |
| 5,464,374 A | * | 11/1995 | Mott | 474/224 |
| 5,690,049 A | * | 11/1997 | Marshall et al. | 116/284 |
| 5,803,013 A | * | 9/1998 | Joshi et al. | 116/328 |
| 6,180,041 B1 | | 1/2001 | Takizawa | |
| 7,373,898 B1 | * | 5/2008 | Tenka | 116/328 |
| 7,633,514 B2 | * | 12/2009 | Asada | 347/139 |
| 8,007,533 B2 | * | 8/2011 | Zhukauskas et al. | 623/13.14 |

(Continued)

FOREIGN PATENT DOCUMENTS

DE   2723783 A1   12/1978

(Continued)

OTHER PUBLICATIONS

Office Action for German Patent Application 10 2010 016 969.2 issued Aug. 8, 2011.

*Primary Examiner* — R. A. Smith

(74) *Attorney, Agent, or Firm* — Edwards Wildman Palmer LLP; James E. Armstrong, IV; Stephen D. LeBarron

(57) ABSTRACT

An instrument system includes a speedometer as an indicating instrument. The speedometer includes a disk-like dial, a movement element, and an indicating needle. The dial includes an indication element indicative of vehicle's speed. The movement element has an output shaft connected to a measurement device measuring the vehicle's speed and configured to rotate based on measurements obtained by the measurement device. The needle is attached to the output shaft by a mounting structure. The needle includes a skirt attached to the output shaft of the movement element, and a pointer extending radially from the skirt, so as to be rotated by the output shaft and indicate a value of interest of the indication element of the dial. The skirt includes a hole into which the output shaft is press-fit. The hole has an elliptical cross section.

2 Claims, 2 Drawing Sheets

U.S. PATENT DOCUMENTS

2004/0159281 A1 * 8/2004 Abe et al. ..................... 116/284
2009/0154136 A1    6/2009 Harada et al.

FOREIGN PATENT DOCUMENTS

| | | |
|---|---|---|
| DE | 3425029 A1 | 1/1985 |
| DE | 9307730 U1 | 7/1993 |
| DE | 69309793 T2 | 9/1997 |
| GB | 1578419 A | 11/1980 |
| JP | 59-178937 A | 10/1984 |
| JP | 06-034399 A | 2/1994 |
| JP | 08086669 A * | 4/1996 |
| JP | 11-201784 A | 7/1999 |
| JP | 2009041945 A * | 2/2009 |
| WO | WO-96/02810 A1 | 2/1996 |

* cited by examiner

MOUNTING STRUCTURE OF AN INDICATING NEEDLE FOR AN INSTRUMENT SYSTEM

CROSS REFERENCE TO RELATED APPLICATION

The priority application Japan Patent Application No. 2009-121700 upon which this patent application is based is hereby incorporated by reference.

BACKGROUND OF THE INVENTION

1. Field of the Invention

The present invention relates to an instrument system mounted, for example, in a movable body such as a vehicle and a vessel, and in particular to a mounting structure of an indicating needle for the instrument system including an instrument unit and a measurement device, in which the indicating needle is attached to an output shaft of the instrument unit, the output shaft being operable to rotate in response to measurements obtained by the measuring device.

2. Description of the Related Art

A movable body such as a vehicle and a vessel incorporates an instrument system adapted to present information to a driver, the information obtained by measurement devices.

As the instrument system of this kind, for example, an analog-type instrument system is used that makes the indicating needle rotate on the basis of measurements obtained by the various measurement devices, and makes the indicating needle point to indications elements of a dial representing various conditions of the movable body, and thereby allows the measurements to be presented to the driver of the movable body.

The above analog-type instrument system may include (a) a box-shaped instrument case, (b) an instrument unit accommodated in the instrument case, (c) a dial provided on a front side of the instrument unit (i.e., on a side facing the driver), and accommodated in the instrument case, (d) indication elements provided on the dial indicative of the various conditions of the movable body, (e) an indicating needle arranged on the front side of the dial, (f) a light source arranged on a back side of the dial (i.e., on a distal side when viewed from the driver) and adapted to emit light illuminating the dial and the indicating needle, (g) a facing plate provided on the front side of the dial and adapted to cover the regions of the dial that is not involved in information indication, and (h) a transparent cover provided on the front side of the facing plate and configured to cover an opening of the instrument case.

The instrument unit includes an output shaft that rotates in response to measurements obtained by the measurement devices that measure the various conditions of the movable body. The indicating needle includes a mounting portion attached to the output shaft of the instrument unit, serving as a centre of rotation of the output shaft, and a pointer portion extending radially outward of the mounting portion. The indicating needle is configured to be rotated by the output shaft of the instrument unit and point to the indication elements of the dial by its pointer portion.

Also, the along-type instrument system includes a fixation structure for attaching the indicating needle to the output shaft of the instrument unit to secure the indicating needle to the output shaft.

As the fixation structure, various conventional fixation structures are advocated (for example, see Japanese Patent Application Laid-Open Publication No. H06-034399, hereafter referred to as the patent literature PTL 1).

Referring to FIG. 4, there is shown an exploded perspective view of the fixation structure adapted to secure the indicating needle to the output shaft of the conventional instrument unit disclosed in the patent literature PTL 1.

The fixation structure 40 illustrated in FIG. 4 includes a rotation-preventing feature 49 and a detachment-preventing feature 50 provided on an output shaft 42 of an instrument unit 41 and on a mounting portion 46 of an indicating needle 45 mounted to the output shaft 42.

The rotation-preventing feature 49 includes a plurality of flat portions 43 provided at an end of the output shaft of the instrument unit 41, and an insert hole 47 provided in a mounting portion 46 of the indicating needle 45 and is defined such that the output shaft 42 can be inserted thereinto.

The flat portions 43 define an outer circumference surface of the end of the output shaft 42, the end thus taking a quadrangular-prism-like shape. The insert hole 47 has a quadrangular planar shape defined such that the quadrangular-prism-like end of the output shaft 42 can be inserted into the insert hole 47.

The detachment-preventing feature 50 includes a protrusion 44 that protrudes at a base end of the output shaft 42 of the instrument unit 41; and an engagement hole 48 provided in the mounting portion 46 of the indicating needle 45 and is configured to be brought into engagement with the protrusion 44.

The protrusion 44 protrudes from the outer circumference surface of the output shaft 42 of the instrument unit 41.

The engagement hole 48 extends from an outer surface of the mounting portion 46 and communicates with the inner surface 47a of the insert hole 47.

In the fixation structure 40 with the above configuration, when the output shaft 42 of the instrument unit 41 is inserted into the insert hole 47 provided in the mounting portion 46 of the indicating needle 45, the flat portions 43 of the end of the output shaft 42 abut on the inner surface 47a of the insert hole 47 of the indicating needle 45. Also, the protrusion 44 at the base end of the output shaft 42 is brought into engagement with the engagement hole 48 of the mounting portion 46 of the indicating needle 45.

In the above-described manner, by virtue of the flat portions 43 of the output shaft 42 constituting the rotation-preventing feature 49, wherein the flat portions 43 abuts on the inner surface 47a of the insert hole 47 of the indicating needle 45, the fixation structure 40 prevents the output shaft 42 from rotating in and relative to the insert hole 47. Also, by virtue of the protrusion 44 of the output shaft 42 constituting the detachment-preventing feature 50, which is brought into engagement with the engagement hole 48 of the indicating needle 45, the fixation structure 40 prevents the output shaft 42 from being taken inadvertently out of the insert hole 47. In this manner, the indicating needle 45 is effectively secured to the output shaft 42 of the instrument unit 41.

SUMMARY OF THE INVENTION

The fixation structure disclosed in the patent literature PTL 1 has a drawback that should be addressed.

Specifically, since a planar shape of the insert hole provided in the mounting portion of the indicating needle has a quadrangular shape, a stress concentrates upon a corner within the insert hole as the output shaft inserted into the insert hole is rotated, causing crack to occur in the mounting portion, which leads to damage inflicted on the indicating needle.

In view of the above-identified drawback, an object of the present invention is to provide a mounting structure of an indicating needle for an instrument system capable of prevent damage to the indicating needle with a simple structure.

In order to solve the problem and attain the object, there is provided a mounting structure of an indicating needle in an instrument system, the mounting structure including (a) an instrument unit having an output shaft adapted to rotate in response to a measurement, (b) an indicating needle including a mounting portion attached to the output shaft and a pointer portion extending radially from the mounting portion, the indicating needle configured to be rotated by the output shaft and point to an indication element indicative of the measurement of a dial; and (c) a hole provided in the mounting portion, the output shaft being press-fit into the hole, and the hole having a cross section in a shape of an ellipse.

Since the hole of the mounting portion into which the output shaft of the instrument unit is inserted has the elliptical cross section, it is possible to prevent concentration of stress from occurring in the hole as a result of rotation of the output shaft of the instrument unit.

Preferably, the output shaft has a cross section in a shape of an ellipse.

According to the above additional feature of the present invention, since the output shaft has the elliptical cross section, it is possible to prevent the output shaft from rotating within and relative to the hole.

As has been described in the foregoing, since it is possible to prevent concentration of stress from occurring in the hole as a result of rotation of the output shaft of the instrument unit, it is made possible to prevent crack from occurring in the mounting portion and the indicating needle can be protected against damage. Accordingly, it is possible to prevent damage to the indicating needle with a simple structure.

Also, since it is possible to prevent rotation of the output shaft within and relative to the hole, it is made possible for the indicating needle to be effectively rotated via the rotation of the output shaft.

BRIEF DESCRIPTION OF THE DRAWINGS

The above and other objects and advantages of the present invention will be apparent upon reading of the following detailed description, taken in conjunction with the following accompanying drawings, in which like reference numerals represent corresponding parts throughout.

DESCRIPTION OF AN EXEMPLARY EMBODIMENT

The following describes a mounting structure of an indicating needle (hereafter simply called a "mounting structure") according to an exemplary embodiment of the present invention with reference to FIGS. 1 to 4.

Figure 1:
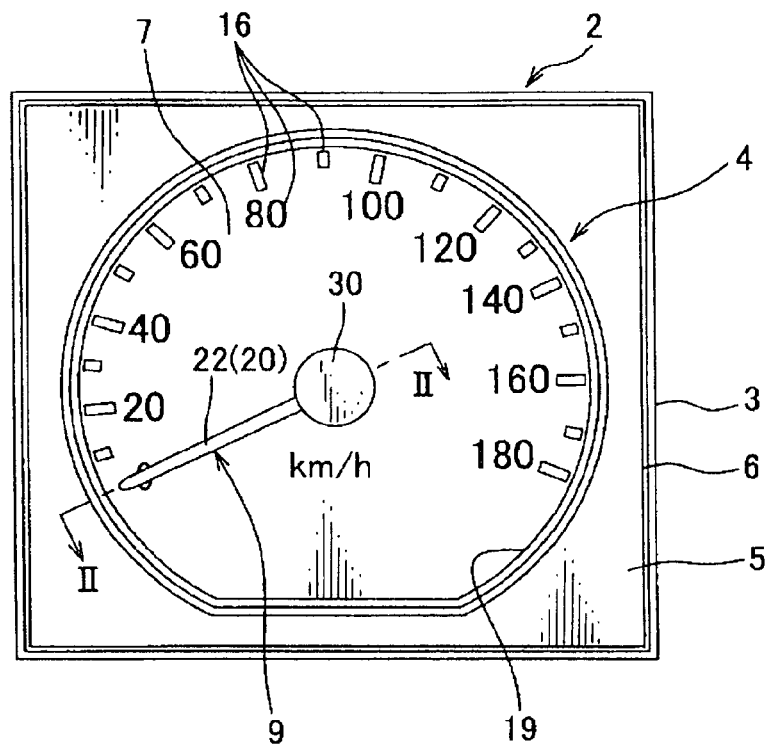
FIG. 1 is a plan view illustrating an instrument system including a mounting structure of an indicating needle according to one embodiment of the present invention.

The mounting structure 1 according to the exemplary embodiment of the present invention is, for example, for use in an instrument system 2 illustrated in FIG. 1.

The instrument system 2 is mounted in a vehicle such as an automobile, and is configured to indicate various conditions of the vehicle for recognition by a driver of the vehicle.

The instrument system 2 illustrated in FIG. 1 includes (a) an instrument case 3, (b) a speedometer 4 as an indicating instrument indicating a speed of the vehicle, (c) a facing member 5 attached to the instrument case 3 and arranged on a front side (throughout the description, the "front side" is a proximal side of the speedometer 4 facing the vehicle's driver, and may be simply referred to as "the side facing the driver"), and (d) a transparent cover 6 covering the front side.

Throughout this embodiment, for the sake of simplicity, the illustrated configuration will only include the speedometer 4 as the indicating instrument indicating the vehicle's speed, and, needless to say, the configuration may include more than one indicating instrument such as a tachometer indicating rotation of an engine of the vehicle, a temperature gauge indicating a temperature of a coolant of the engine, and a fuel level gauge indicating fuel level.

Figure 2:
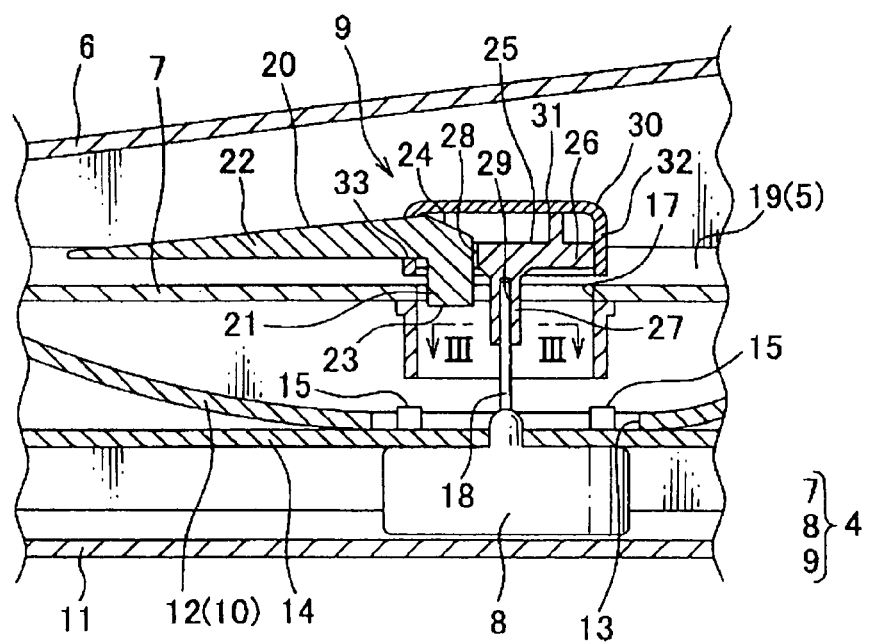
FIG. 2 is a cross-sectional view taken along the line II-II of FIG. 1.

The instrument case 3 may be made of synthetic resin. As shown in FIG. 2, the instrument case 3 includes a case main body 10 and a back cover 11. The case main body 10 includes a front wall in a flat shape facing the vehicle's driver, a surrounding wall upstanding from an outer periphery of the front wall and extending in a direction away from the vehicle's driver. The case main body 10 is made in a shape of a box opening on a backside, i.e., a distal side when viewed from the driver. Also, the surrounding wall defines an outer shape of the case main body 10, i.e., which in turn defines an instrument case 3.

Also, as shown in FIG. 2, there is provided a dial mounting space 12 and an opening 13 on the front wall of the case main body 10, the dial mounting space 12 to which a dial 7 (to be later described) of the speedometer 4 is attached. An output shaft 18 (to be later described) of a movement element 8 of the speedometer 4 is passed through the opening 13, and a plurality of light-emitting diodes (LEDs) 15 of a printed circuit board 14 (to be later described) is disposed in the opening 13.

The dial mounting space 12 has a concave shape on the front wall when viewed from the vehicle's driver and has a similarity shape with respect to the outer shape of the dial 7 (to be later described). A reflection surface is provided on a front face (on the surface facing the vehicle's driver) of the dial mounting space 12. The reflection surface reflects a light from a plurality of LEDs 15 of a printed circuit board 14 (to be later described).

The opening 13 extends through the front wall of the case main body 10 of the instrument case 3, and is disposed at a central portion of the dial mounting space 12. Also, the opening 13 is positioned to be in register with the through-hole 17 of the dial 7 (to be later described). Also, the output shaft 18 (to be later described) of the movement element 8 of the speedometer 4 is passed through the opening 13, and a light from the LEDs 15 of the printed circuit board 14 (to be later described) is let to pass through the opening 13 toward the dial 7 which is to be discussed below.

The back cover 11, as shown in FIG. 2, has an external form in a flat shape in a similarity of an external form of the surrounding wall of the case main body 10. The back cover 11 is attached to the distal side of the case main body 10 when viewed from the vehicle's driver, i.e., the back side, so that the opening of the case main body 10 is closed.

Also, the instrument case 3 having the above construction and arrangement is attached to the facing member 5 such that the dial 7 (to be later described) of the speedometer 4 is disposed on the front side (i.e., the side facing the driver) of the dial mounting space 12 defined on the front wall of the case main body 10, and such that the dial 7 is sandwiched between the facing member 5 and the front wall, and with the back cover 11 attached to the back side (i.e., the distal side away from the vehicle's driver) of the case main body 10, so that the opening of the case main body 10 is closed.

Also, there is provided a printed circuit board 14 between the case main body 10 of the instrument case 3 and the back cover 11, the printed circuit board 14 being made of non-resilient, stiff synthetic resin and having a plane that is in a substantially rectangular flat shape.

The LEDs 15 are attached to a front surface of the printed circuit board 14, the front surface facing the front wall of the case main body 10, and the LEDs 15 being constructed to illuminate an indication element 16 (to be later described) of the dial 7 of the speedometer 4 along with the indicating needle 9. Further, a movement element 8 (to be later described) of the speedometer 4 is provided on a back side of the printed circuit board 14, with the output shaft 18 attached to the movement element 8 such that the output shaft 18 protrudes from the front side of the printed circuit board 14, and thus the LEDs 15 and the movement element 8 are electrically connected to each other via the printed circuit board 14.

Also, the printed circuit board 14 incorporates various electronic components such as a microcontroller controlling operation of the LEDs 15 and the movement element 8. Also, the printed circuit board 14 is arranged substantially in parallel with the front wall of the case main body 10 of the instrument case 3 and also in parallel with the back cover 11. The printed circuit board 14 is attached between the case main body 10 and the back cover 11, and thus accommodated in the instrument case 3.

The speedometer 4, as shown in FIG. 1 or FIG. 2, includes the dial 7, movement element 8, and an indicating needle 9. The dial 7 includes the indication elements 16 including a scale indicating the vehicle's speed, figures, characters and/or other symbols that are provided on the front face (the proximal side that is viewed by the vehicle's driver).

The dial 7 may be made of translucent synthetic resin and take a disk-like shape. The dial 7 has a light-blocking layer on its front face facing the vehicle's driver, and the indication elements 16 are constituted with regions of the light-blocking layer excluded the regions including scale, figures, characters, and/or symbols. The indication element 16 is arranged substantially in a shape of an arc corresponding to the limits of rotation of the indicating needle 9 (to be later described).

Also, the dial 7 has a through-hole 17. The through-hole 17 is being provided at a central portion of the indication element 16 such that the output shaft 18 (to be later described) of the movement element 8 is passed therethrough. The through-hole 17 is provided at a position corresponding to the opening 13 provided on the front wall of the case main body 10. Also, the dial 7 is attached to the dial mounting space 12 provided on the front wall of the case main body 10 of the instrument case 3, so that the indication element 16 let the light from behind, i.e., the light from the plurality of LEDs 15 (to be later described) passed forward, i.e., toward the driver's side, so that the illumination is viewed by the vehicle's driver.

The movement element 8 is attached to the back side of the printed circuit board 14, i.e., a distal side thereof when viewed from the vehicle's driver, and is connected to a not-shown device for measuring the vehicle's speed and other in-vehicle components.

The movement element 8 includes the output shaft 18 that may be adapted to rotate in response to the measurements obtained by the device measuring the vehicle's speed. Also, with regard to the movement element 8, the output shaft 18 is passed through the through-hole 17 of the dial 7 and the opening 13 of the case main body 10, attached to the back side of the printed circuit board 14, and accommodated in the instrument case 3.

It should be noted that the movement element 8 corresponds to the instrument unit as defined in the appended claims.

As shown in FIG. 1 or FIG. 2, the indicating needle 9 is configured to rotate integrally with the output shaft 18 of the movement element 8. Also, by virtue of the mounting structure 1, the indicating needle 9 is attached to the output shaft 18 of the movement element 8 such that a base end 21 (to be later described) is positioned at a central portion of the indication elements 16 of the dial 7. The detailed configuration of the indicating needle 9 and the mounting structure 1 is to be described later.

The speedometer 4 having the above construction and arrangement makes the output shaft 18 and the indicating needle 9 rotate in response to the measurements obtained by the measuring device. Also, the conditions of the vehicle (such as measurements) is presented to the vehicle's driver through the indicating needle 9 pointing to a desired value out of the indication elements 16 of the dial 7.

The facing member 5, as shown in FIG. 1, is provided on the side of the dial 7 facing the vehicle's driver (i.e., the front side), and attached to the case main body 10 such that the dial 7 is sandwiched between the facing member 5 and the front wall of the case main body 10 of the instrument case 3.

The facing member 5 includes an exposure window 19 adapted to let the indication elements 16 of the dial 7 exposed to the vehicle's driver. Also, the facing member 5 is attached to the case main body 10 of the instrument case 3 such that regions are shielded so as not to be viewed by the vehicle's driver except for the regions related to indication by the speedometer 4.

The transparent cover 6 may be made of transparent synthetic resin. The transparent cover 6 is arranged on the side of the facing member 5 viewable by the vehicle's driver, i.e., on the front side.

The transparent cover 6 is attached to the case main body 10 such that the dial 7 and the facing member 5 are sandwiched between the transparent cover 6 and the front wall of the case main body 10 of the instrument case 3.

The transparent cover 6 covers a front side of the speedometer 4 and the facing member 5, i.e., the side viewable by the vehicle's driver, and prevents dusts from entering an inside of the instrument system 2.

The following describes the configuration of the indicating needle 9.

The indicating needle 9 is rotated integrally with the output shaft 18 of the movement element 8 in response to the measurements measured by a measuring device, so as to indicate the measurements in cooperation with the indication element 16 of the dial 7.

The indicating needle 9 shown in FIG. 2 includes an indicating needle main body 20, an indicating needle skirt 25 attached to the output shaft 18, with the indicating needle main body 20 and an indicating needle cap 30 attached to the indicating needle skirt 25. The indicating needle skirt 25 corresponds to the mounting portion as defined in the appended claims.

The indicating needle main body 20 may be made of translucent synthetic resin. The indicating needle main body 20, as shown in FIG. 2, includes in one piece therewith the base end 21 adapted to be rotated integrally with the output shaft 18 of the movement element 8, and an pointer portion 22 linearly extending from the base end 21 and radially of the base end 21.

The base end 21 is made in a shape of a quadrangular prism, and includes a light-receiving surface 23 adapted to receive a light from the LEDs 15, and a reflection surface 24 adapted to reflect the light incoming from the light-receiving surface 23 toward the tip of the pointer portion 22.

The light-receiving surface 23 is provided on a surface opposed to the dial 7 of the base end 21. The reflection surface 24 is arranged at a position opposed to the light-receiving surface 23, and slanted in proportion to gradually coming close to the pointer portion 22 and in proportion to becoming more spaced from the dial 7.

The pointer portion 22 has a shape of a cone tapering in proportion to becoming more spaced from the base end 21. The cross section of the pointer portion 22 is in a shape of a rectangle.

As shown in FIG. 2, the pointer portion 22, is attached via the base end 21 to the indicating needle skirt 25 attached to the output shaft 18. The pointer portion 22 is configured to be rotated by the output shaft 18 and point to a value of interest out of the indication elements 16 of the dial 7.

The indicating needle skirt 25 may be made of opaque synthetic resin and, as shown in FIG. 2, includes a disk-like skirt main body 26 and a projection 27 protruding from a central portion of the skirt main body 26.

The base end 21 of the indicating needle main body 20 is press-fit into the skirt main body 26 via a fit-in hole 28 made in the skirt main body 26, the fit-in hole 28 being configured to secure the indicating needle main body 20 to the skirt main body 26. The skirt main body 26 also includes a pair of retaining nails (not shown)

The fit-in hole 28 extends through the skirt main body 26 and has a rectangular planar shape substantially identical with an external form of the base end 21. The pair of retaining nails protrude from an outer periphery of the skirt main body 26 in a radial direction such that the skirt main body 26 is placed between the retaining nails.

The retaining nails are each configured to be brought into locking with a pair of not-shown locking portions (to be later described) of the indicating needle cap 30 when the indicating needle cap 30 is attached to the indicating needle skirt 25.

The projection 27 has a cylindrical shape extending from the central portion of the skirt main body 26 toward the dial 7. A hole 29 is provided in the projection 27. The output shaft 18 of the movement element 8 is press-fit into the hole 29.

The indicating needle main body 20 having the above configuration is attached to the indicating needle skirt 25 with the base end 21 of the indicating needle main body 20 press-fit into the fit-in hole 28 of the skirt main body 26, such that pointer portion 22 of the indicating needle main body 20 extending from the skirt main body 26, i.e., from the indicating needle skirt 25, and radially of the indicating needle skirt 25.

The indicating needle cap 30 is attached to the indicating needle skirt 25 with the pair of retaining nails each brought into locking with the pair of locking portions (to be later described) of the indicating needle cap 30. More specifically, the indicating needle cap 30 is attached to the skirt main body 26 of the indicating needle skirt 25 such that the base end 21 of the indicating needle main body 20 is covered by the indicating needle cap 30.

The indicating needle cap 30 may be made of opaque synthetic resin and, as shown in FIG. 2, includes a disk-like ceiling wall 31, and a surrounding wall 32 upstanding from a circumference of the disk-like ceiling wall 31, these walls defining a cylinder having a ceiling. Also, the indicating needle cap 30 includes a notch portion 33, a pair of locking portion (not shown), and a balance element (not shown).

The notch portion 33 is a portion of the surrounding wall 32 that is notched from a tip of the surrounding wall 32 toward the centre of the ceiling wall 31. With regard to the notch portion 33, when the indicating needle cap 30 is attached to the indicating needle skirt 25, an end on the side of the base end 21 of the pointer portion 22 of the indicating needle main body 20 inside of which it is attached to the indicating needle skirt 25, it is thus so arranged.

The pair of locking portions takes a shape of a recess recessed relative to an inner surface of the surrounding wall 32 and are arranged as opposed to each other such that the centre of the ceiling wall 31 is positioned in between. The pair of locking portions are each provided on a one-on-one basis with respect to the pair of retaining nails of the indicating needle skirt 25. When the indicating needle cap 30 is attached to the indicating needle skirt 25, the retaining nails of the indicating needle skirt 25 is inserted into and brought into locking with the pair of locking portions, respectively.

The balance element is attached to a portion of an inner surface of the ceiling wall 31, the portion being spaced from the notch portion 33.

The balance element is provided to ensure balance between the pointer portion 22 and the balance element in terms of weight, the pointer portion 22 being disposed within the notch portion 33 and protruding in the radial direction of the indicating needle cap 30. By virtue of the balance element, the indicating needle 9 extending in its longitudinal direction can maintain its balance.

The indicating needle cap 30 having this configuration is attached to the indicating needle skirt 25 with a proximal end of the pointer portion 22 continuing to the base end 21 positioned in the notch portion 33 of the cap 30. In this state, the base end 21 is press-fit into the fit-in hole 28. Also, the base end 21 is placed between and covered by the cap 30 and the skirt 25.

The indicating needle cap 30 is secured to the indicating needle skirt 25 with the retaining nails of the indicating needle skirt 25 each inserted into and brought into locking with the pair of locking portions.

Figure 3:
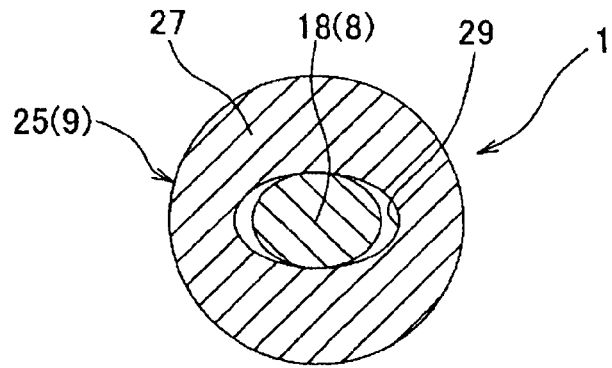
FIG. 3 is a cross-sectional view taken along the line of FIG. 2.
Figure 4:
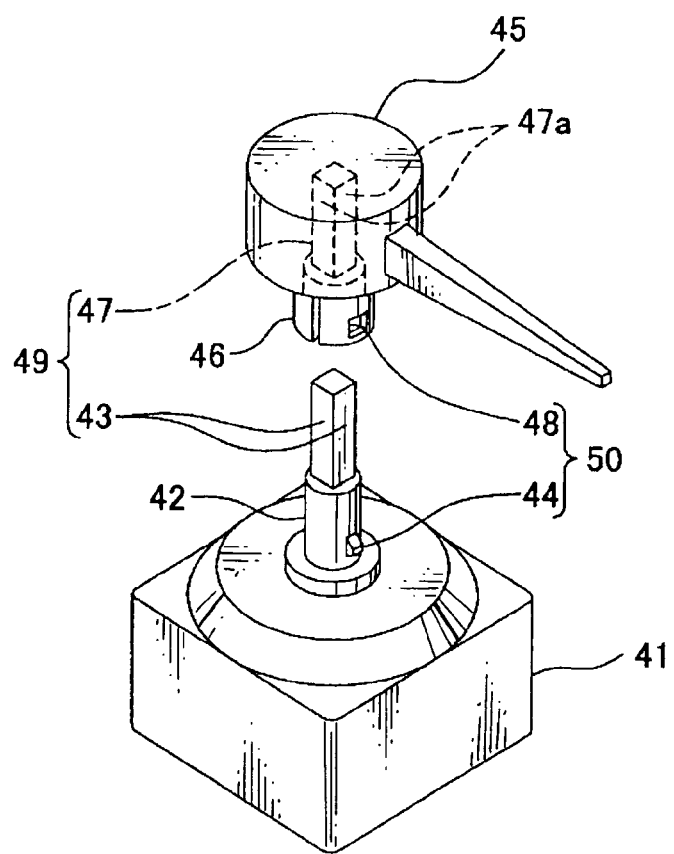
FIG. 4 is an exploded perspective view of a mounting structure of an indicating needle of a conventional instrument system.

The mounting structure 1 constructed to attach the indicating needle 9 to the output shaft 18 of the movement element 8, as shown in FIG. 2 or FIG. 3, includes the output shaft 18, and the hole 29 of the projection 27 of the indicating needle skirt 25 of the indicating needle 9. As has been described in the foregoing, the output shaft 18 is press-fit into the hole 29.

It is important to note that the output shaft 18 is in a shape of a bar having an elliptical cross section. The hole 29 has an elliptical cross section. More specifically, a long axis of the elliptical cross section of the hole 29 is larger than a long axis of the elliptical cross section of the output shaft 18. Also, a short axis of the elliptical cross section of the hole 29 is slightly smaller than a short axis of the output shaft 18.

In the mounting structure 1 shown in FIG. 2 or FIG. 3, by virtue of insertion of (a) the output shaft 18 of the movement element 8 into (b) the hole 29 of the projection 27 of the indicating needle skirt 25 of the indicating needle 9, the indicating needle 9 is secured to the output shaft 18 and thus the indicating needle 9 is attached to the movement element 8 via the output shaft 18.

According to this embodiment, since the hole 29 of the indicating needle skirt 25 of the indicating needle 9, into which the output shaft 18 of the movement element 8 is inserted, has the elliptical cross section, it is possible to prevent concentration of stress from occurring in the hole 29 as a result of rotation of the output shaft 18 of the movement element 8. This further makes it possible to prevent crack from occurring in the indicating needle skirt 25, and to effectively prevent damage to the indicating needle 9. Accordingly, it is possible to prevent damage to the indicating needle 9 with a simple structure.

Also, since the output shaft 18 has the elliptical cross section, it is possible to prevent the output shaft 18 from rotating within the hole 29. This further allows stable rotation of the indicating needle 9 when the output shaft 18 is rotated.

In the mounting structure 1 of this embodiment, the output shaft 18 of the movement element 8 has the elliptical cross section. However, in the present invention, the cross section of the output shaft 18 may be in a circular shape.

It should be noted that the embodiment represents a typical form of the present invention, and which is not limited to the same embodiment. Accordingly, the present invention can be effectuated with various modifications within the scope and spirit of the present invention.

What is claimed is:

1. A mounting structure of an indicating needle in an instrument system, comprising:
   (a) an instrument unit having an output shaft adapted to rotate in response to a measurement;
   (b) an indicating needle including a mounting portion attached to the output shaft and a pointer portion extending radially from the mounting portion, the indicating needle being adapted to be rotated about the output shaft and point to an indication element of a dial indicative of the measurement; and
   (c) a hole provided in the mounting portion, the output shaft being press-fit into the hole, and the hole having a cross section in a shape of a non-circular ellipse.

2. The mounting structure according to claim 1, wherein the output shaft has a cross section in a shape of an ellipse.

* * * * *